United States Patent Office 2,864,934
Patented Dec. 16, 1958

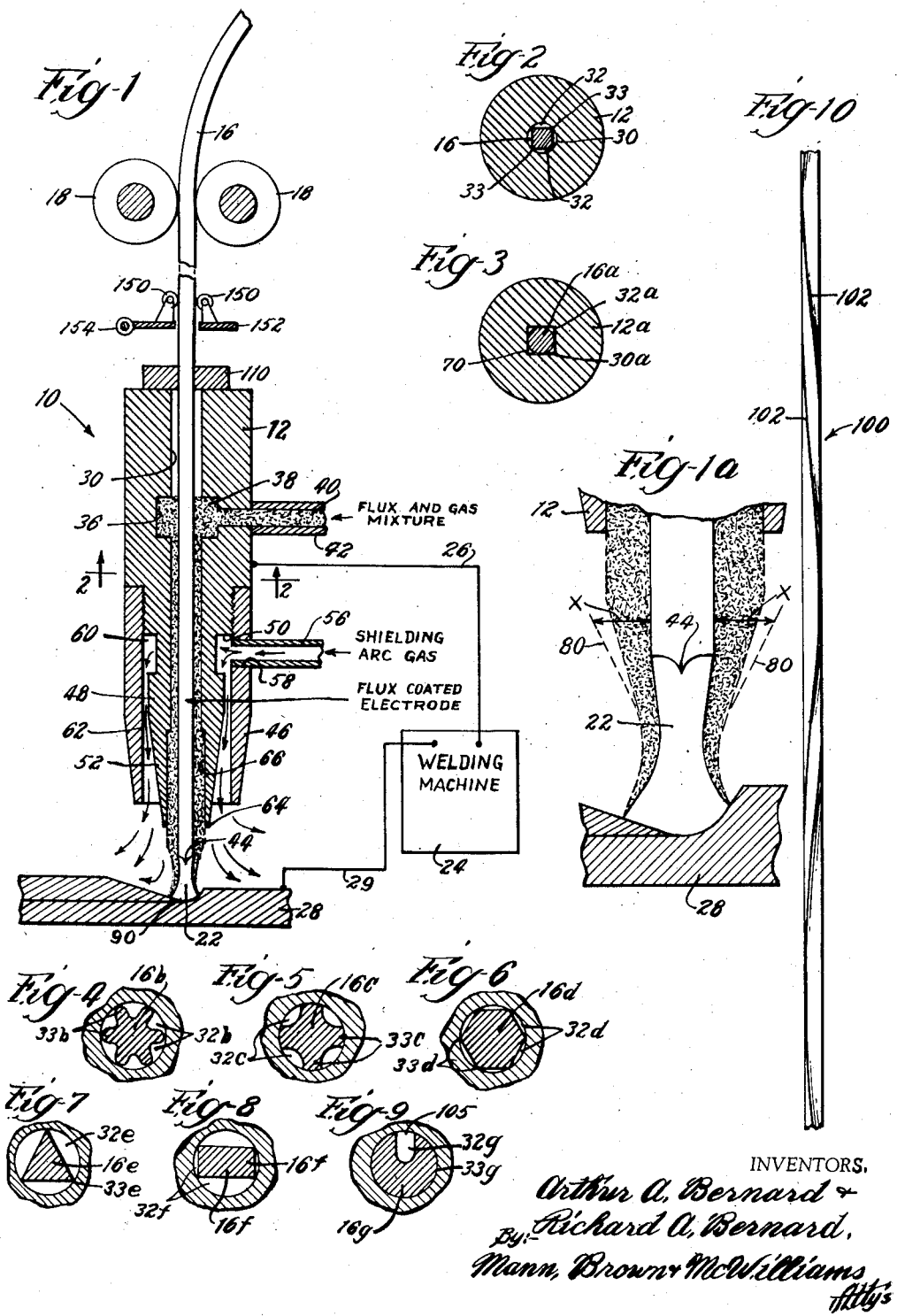

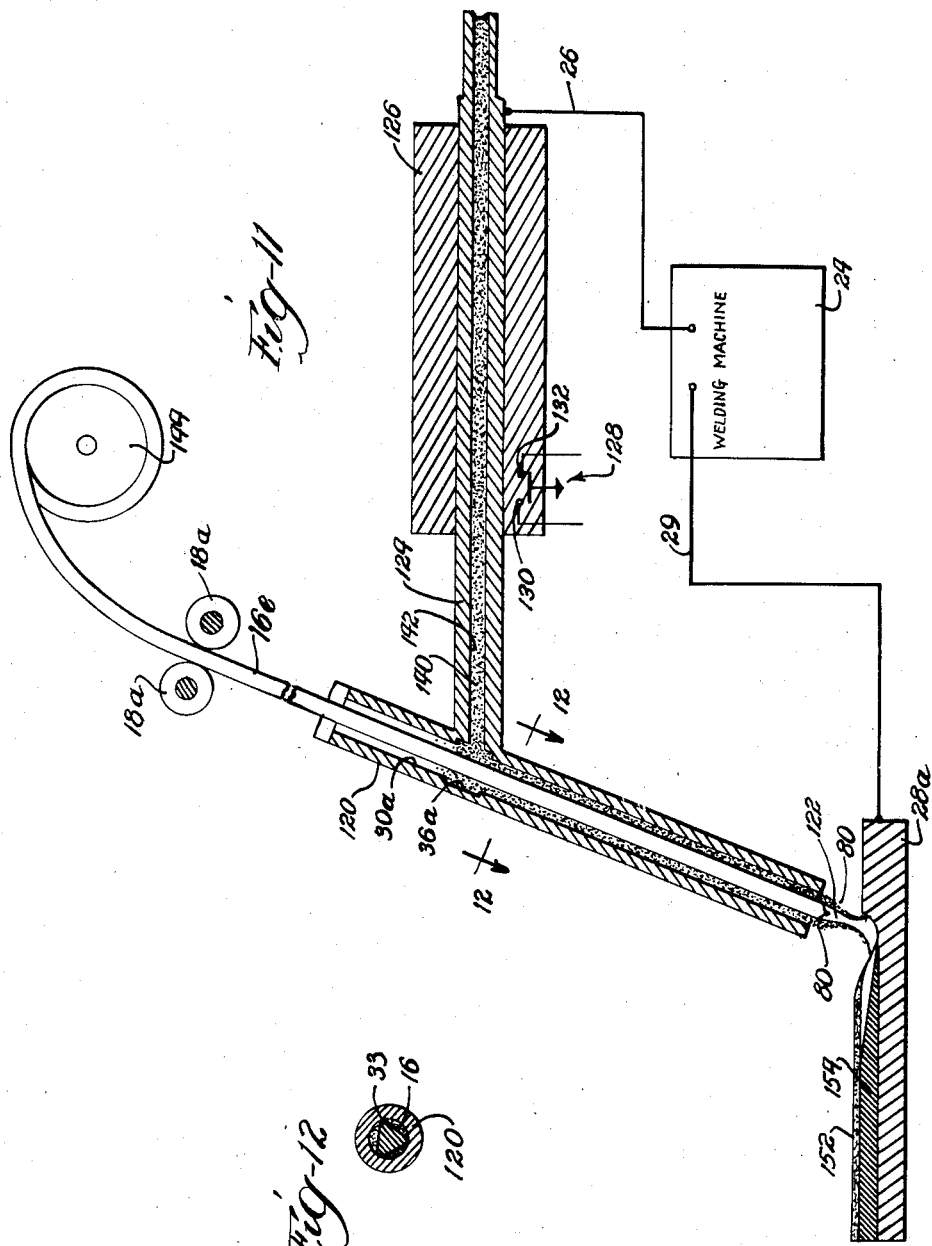

2,864,934

METHOD AND APPARATUS FOR FLUID FLUX ARC WELDING

Arthur A. Bernard and Richard A. Bernard, Chicago Heights, Ill.

Application September 20, 1957, Serial No. 685,343

12 Claims. (Cl. 219—74)

This invention relates to arc welding and more particularly to a new method of fluxing a welding arc produced at the tip of an automatically fed consumable electrode whereby the electrode is coated with flux during the actual welding operation.

There are many reasons why a flux is necessary when arc welding common steel. To name just a few, (a) the flux must contain materials which will protect the arc from harmful ambient air unless a separate gas is used for this purpose, (b) deoxidizers are required for removing the gases contained in the fused base metal, (c) stabilizers are required for producing a more highly efficient ionized arc, (d) emissifiers are required for governing the rate of electrode deposition in a plus or minus form as compared to the normal deposition rate for a fixed welding current density, and (e) to produce the highest possible quality welds, the flux should produce a protective slag over the surface of the weld. These are only five of the more important reasons why a flux is necessary for arc welding common steel. There is no one element or compound which can render all of these requirements; hence, arc welding fluxes are generally composed of a mixture of several kinds of compounds.

Since shielded automatic consumable-electrode arc welding first began, the main problem has been to develop a suitable method of conveying the flux to, and planting the flux in the welding arc, in a way which does not interfere with making welding current contact to the electrode a short distance above its tip where the arc performs. Generally, electric contact is made to the electrode by feeding it through what is commonly called a current contact tube. This contact tube forms a portion of the welding current circuit; the electrode is fed through the contact tube in contact with it, and the electrode becomes charged with welding current, thus forming that portion of the welding current circuit between the contact tube and the arc. Obviously, to produce an uninterrupted continuous welding arc, the electrode must have at least a portion of its surface bare throughout its length for contact with the contact tube, and since the flux material is an electrical insulator, the introduction of the flux into the welding arc must be done in a manner that will not interfere with the electrical contact between the tube and the electrode.

There have been used in the past a number of different methods for conveying the flux to and planting the flux in the welding arc. These methods can be catalogued in two separate groups, namely, those methods whereby the flux is incorporated with the electrode and contains materials which emit a gas for shielding the arc, and those methods whereby the flux does not contain such gas emitting materials but rather, the shielding gas is fed to the arc zone from a separate source. Many dozens of patents have been granted on methods and devices relating to this first group and these included the concept of providing core wires with barbs, ridges, depressions, etc., which provided protrusions of one sort or another extending through the coatings of flux for making welding current contact to the core wire as it rubbed against the bore of the current contact tube. None of these many different methods of making welding current contact through coating of flux are being used today in any sizable quantity, for the reason that none of them could be satisfactorily manufactured on a commercial scale. There were many reasons for this lack of production on a commercial scale; the main difficulty was preventing the bond holding the coatings of flux to the surface of the electrode from loosening when the electrode was being coiled during manufacture and, again when the electrode was uncoiled during welding. The majority of the patents related to this first group were granted ten and more years ago; in more recent years, the approach taken by all arc welding research laboratories is that this main difficulty would be proportionately reduced if the volume of flux used while depositing a given volume of welding electrode could be reduced. Therefore, the general more recent trend has been toward the second group mentioned above, namely, to omit from the flux the materials that were formerly employed for emitting the arc shielding gas and to substitute for these materials by using a gas from a separate source for shielding the arc.

In this second group of methods, the most simple method (and also the most inefficient method) has been to alloy the flux materials in the electrode metal and, of course, furnish the shielding medium by the use of a gas from a separate source. This method is very much limited because the flux materials must be limited to metals which can be alloyed in the electrode metal; hence, this limitation prohibits the use of important beneficial oxides. Another method of this group employs the use of a separate shielding gas and a tubular form of electrode with the flux composition contained within the core of the electrode. Very high quality welds can be made with this method because there are no restrictions regarding the flux composition, and with this method, the surface of the electrode is completely bare; however, a tubular form of electrode is more difficult and more costly to manufacture than is the common wire electrode. Still another method of this group makes use of a pinion shaped electrode wire with the flux adhered in the grooves running longitudinally of the electrode, with its arc shielded with a separate gas. This method was never very successful because a suitable adhesive has never been found which will prevent the flux from coming loose from within the grooves as the electrode is coiled during manufacture and uncoiled during welding.

Methods have also been developed wherein the shielding gas and not the electrode is used for conveying the flux to the arc zone. These methods permit the use of low cost ordinary round wire electrodes which in turn eliminates the problem of making an efficient welding current contact to them. Primarily, in the prior art there are two types of such methods. In the first of these, the apparatus used at the arc provides for flowing an annular stream of the fluid flux out of an annular shaped channel formed between the outside surface of a current contact tube, and the inner wall of a tubular shaped member commonly called a nozzle. By this first method, the arc operates within the annular shaped stream of the fluid flux; however, for the flux to be useful for the purposes intended it must actually combine with the arc so that it becomes planted down into the crater of the weld were it chemically combines with the welding action, and in practice it has been found that, with this first fluid flux method, only a very small uncontrollable portion of the total volume of flux conveyed to the arc zone by the shielding gas actually enters into the welding action, because the annular column or stream of flux fed down over the arc is separated from the electrode and hence separated from the arc by a dimension which is the wall thickness of the current contact tube. In the other prior art fluid flux method referred to, which is an extension of the first method, an attempt is made to make use of a more efficient portion of the total volume of fluid flux piped to the arc zone by employing a magnetizable type flux so that the flux particles fed to the arc zone outside of the current contact tube are separated from the shielding gas by being attracted to the surface of the electrode at that area extending from the end of the contact tube and the tip of the electrode. This latter method is a considerable improvement over the first described fluid flux method; however, the main objection to this latter method is the impracticability of manufacturing a magnetizable type flux whereby each and every particle of the flux contains a minute piece of iron, thus making each and every particle of the flux magnetizable. Obviously, of the total volume of flux, those particles which are not magnetizable are not attracted to the surface of the electrode to become a portion of the flux coating, and hence are lost and wasted and do not enter into the chemistry of the arc as a whole.

In accordance with our invention, all of the above mentioned undesirable features have been completely eliminated by the combination of several new concepts. Actually, our invention as a whole is based on a new method of and apparatus for applying a coating of flux to the surface of a consumable type electrode and is primarily different from anything heretofore used for the following reasons: (a) a fluid form of flux coating is used; (b) the electrode itself is actually coated with the fluid form of welding flux and hence performs as does a conventional flux coated electrode, yet the flux is not adhered to the surface of the electrode, as is the case with conventional flux-coated electrodes; (c) in actual practice a bare surface electrode is fed through the welding torch, or gun, and is coated with the fluid flux within said gun; (d) the welding electrode is coated with the fluid flux inside the welding current contact tube simultaneously as the electrode is charged with welding current within said tube; (e) the current contact tube confines the coating of fluid flux to the surface of the electrode to within a relatively short distance from the tip of the electrode where the arc performs, and moreover, said tube confines the thickness of the flux coating to a dimension that does not exceed the thicknesses of the coatings adhered or bonded to the surfaces of conventional flux-coated electrodes, whereby, as in the case of conventional flux-coated electrodes, substantially all of the flux enters the arc at the tip of the electrode and hence all of the flux enters into the chemistry of the arc; and (f) the flux formula used in carrying out this invention can either contain or not contain materials for protecting the arc, and if such materials are not used, then a gas from a separate source is used for shielding purposes.

Of equal importance to the above, our invention is based on a phenomenon of the metal-arc welding process which has never been exploited for use as herein described. The phenomenon here referred to is the tremendous jet force which can be produced by the arc for useful purposes. Actually, the jet force is the arc and is created by the rapid rate at which solid electrode metal is converted into metal vapor at the tip of the electrode by the heat of the arc. In regard to the newer gas-shielded consumable-electrode arc welding processes, the miniature size electrodes used are consumed at tremendous speeds because extremely high welding current densities are used; hence, the speed at which electrode metal is converted into metal vapor and shot out into space toward the base metal being welded is proportionally tremendous. An actual example of how high a degree this force can be built up to is in the metal cutting arts wherein this jet force is being used commercially for cutting through, for instance, aluminum plate up to two inches in thickness. By this method the arc at the tip of a $\frac{1}{16}''$ diameter electrode is directed along the top surface of the plate and the force of the jet cuts a kerf about $\frac{3}{16}''$ wide straight through the 2″ thickness plate, similar to a high pressure jet of water cutting into a bank of clay.

A little known and unappreciated feature of this phenomenon is that a thin annular-shaped evacuated area is formed or produced around the peripheral tip of the electrode by this jet force. Actually, in accordance with our invention, it is the vacuum produced by this jet force which accounts for why the coating of flux adhered to conventional coated electrodes is sucked into the arc as the flux is vaporized simultaneously as the core wire is consumed by the heat of the arc. It has occurred to us that this vacuum or evacuated area could be used for sucking a fluid form of welding flux coating into the welding arc stream, and this has been accomplished as hereinafter described.

To accomplish the required result successfully however, because the particles of the flux are in a separated and hence fluid state, the force of the arc jet must be high enough to produce the necessary required vacuum for carrying out this invention and this is done by one of two methods or a combination of these two methods. One of these methods is to use current densities of 70,000 amperes or more per square inch area of electrode. The other method, which is used in such cases where it is not practical to use such high current densities, is to combine a material or materials with the flux composition which have unusually high rates of ionization, as for example, lithium-carbonate or titanium-dioxide. Such highly efficient ionizers act as a super fuel to increase the jet force for a given current density, and hence, permit lower current densities to be used.

In accordance with our invention, a fluid form of flux is used in combination with a bare surface wire electrode. The fluid flux is piped to the arc from a hopper in which the mixture of solid flux materials in powdered and fine granular form are mixed with a gas to produce a fluid consistency. The electrode is fed to the arc from a reel by any of the commonly used methods where feed rolls are powered with an electric motor. One of the main new important features is that the electrode is in effect coated or substantially coated with the fluid form of flux inside the welding current contact tube through which the electrode is also fed and becomes charged with welding current. As welding fluxes are electrical insulators, another important feature is the method used to accomplish this and still make electrical contact to the electrode.

Another main new important feature is that the thickness of the fluid flux coatings are restricted to thicknesses that insure that substantially all of the flux is sucked into the upper region of the arc, so that, as in the case of general practice with conventional flux-coated electrodes, substantially all of the flux enters into the chemistry of the arc.

Still another new important feature, which is not available when the flux coatings are adhered to the surface of the electrode, as is the conventional practice, is that the speed at which the fluid flux is fed to the vacuated area can be greater than the rate at which the electrode is consumed, since the flux is not adhered to the surface of the electrode; therefore, this feature permits the use of thinner thicknesses of flux coatings while maintaining required flux to electrode volume ratios.

A principal object of the invention is to provide a method of and apparatus for arc welding whereby the vacuum produced by the jet force of a metal-vapor welding arc is used for sucking a fluid form of welding flux into the jet stream of the arc.

Another principal object of our invention is to provide a consumable electrode arc welding method and apparatus where the jet force of a welding arc produced by, for instance, welding current densities of 70,000 amperes and higher, is used for exhausting the atmosphere, and hence for producing a vacuated area, around the tip of the welding electrode for sucking into the arc a fluid form of welding flux, conveyed to the vacuated area as a coating on the surface of the electrode through the welding current contact tube.

Another object of the invention is to intensify the jet force of the arc produced with a given welding current density by the addition of highly efficient ionizers mixed with the flux whereby a higher degree of evacuation at the electrode tip is obtained.

A further object of the invention is to provide a method and apparatus for applying a coating of welding flux in fluid form to the surface of a consumable arc welding electrode within the same bore through which the electrode is fed and within which welding current contact is made to the electrode.

Still another object of the invention is to provide a consumable type electrode with an irregular shape whereby channels are formed between the main body of the electrode and the bore of the current contact tube through which the electrode is fed, so that a fluid form of welding flux can be conveyed through said bore without interfering with making welding current contact to said electrode.

Yet another object is to provide a current contact tube with an irregular shaped bore for passage of a round wire electrode through said bore and thus provide for a flow of fluid flux through said bore to be fed into the vacuated area around the periphery of the electrode tip.

Another important object of the invention is to provide an electrode with an irregular shaped cross-section as referred to above, which is provided with a spiral twist, either continuous in one direction throughout the coiled length of the electrode, or spiraled in opposite directions at spaced intervals so that the bore in the contact tube is continuously reamed out during welding as the spiraled electrode is fed through it.

Still a further object of the invention is to provide a method of and apparatus for fluid flux arc welding in which the fluid flux includes materials that will emit a gas for shielding the arc, and permit the elimination of a separate source of shielding gas.

Still another very important object is to provide a method of and apparatus for combining a welding flux with a consumable-electrode welding arc in a way which is extremely simple and inexpensive to produce and to use.

Other objects, uses, and advantages will be obvious or become apparent upon a consideration of the following detailed description together with the application drawing.

In the drawings:

Figure 1 is a diagrammatic cross-sectional view through the pertinent portions of a welding torch, illustrating the principles of my invention applied thereto;

Figure 1a is an enlarged fragmental view of the electrode tip and welding are shown in Figure 1;

Figure 2 is a cross-sectional view along line 2—2 of Figure 1, illustrating the fluid flux channels or conduits defined by the electrode and the welding torch body;

Figure 3 is a view similar to that of Figure 2, illustrating another embodiment of the invention;

Figures 4 through 9 are cross-sectional views illustrating different electrode cross-sectional shapes that may be employed in carrying out my invention;

Figure 10 is a side elevational view of a portion of the electrode shown in Figure 1, illustrating another feature of the invention;

Figure 11 is a diagrammatic cross-sectional view through the pertinent portions of a welding torch, illustrating a modified form of the invention in which the separate source of shielding gas is eliminated; and Figure 12 is a cross-sectional view along line 12—12 of Figure 11.

Referring now to Figures 1 and 2 of the drawings, which illustrate an embodiment of the invention wherein a separate gas is used for shielding the arc, reference numeral 10 generally indicates a welding torch including a body 12 that forms the aforementioned contact tube. The torch 10 includes suitable insulating structures, switches, a handle, etc. of a conventional nature and which are omitted in interests of simplicity. The gun 10 is assumed to be of the manually applied gun type welding device, although it should be understood that my invention is readily adapted to fully automatic arc welding methods and apparatus.

The welding torch 10 is provided with a consumable electrode 16 fed from a reel (not shown) by an appropriate electrode feeding mechanism that may include feed rollers 18 powered by an appropriate motor (not shown). The body 12 that forms the welding current contact tube slidingly receives the electrode, the body or tube 12 being in electrical contact with the electrode during operation of the torch as the electrode is fed to a welding arc 22 by rollers 18. Welding arc 22 is formed by electrical current supplied by an appropriate welding machine 24 electrically connected to the tube or body 12 by a lead 26 and electrically connected to the workpiece 28 by an appropriate lead 29.

As indicated by Figure 2, the body or tube 12 is formed with a longitudinally extending passageway 30 which is rounded or generally circular in configuration, while electrode 16 has a generally square cross-sectional configuration. The body or tube 12 and the electrode thus define a plurality of channels or passages 32 that extend longitudinally of the electrode, the corners of the electrode forming protrusions 33 that contact the body or tube 12 so that electrical contact is established between the electrode and the body or tube 12.

The body or tube 12 is also formed with an internal recess 36 through which the electrode 16 passes. Recess 36 forms a pooling chamber 38 for fluid flux 40 which is piped from an appropriate source, such as the apparatus disclosed in Patent No. 2,549,033, issued to Joseph M. Tyrner on April 17, 1951, into the chamber 38 by an appropriate conduit 42 or the like. The channels 32 are in open communication with chamber 38 and the fluid flux, being a mixture of finely divided solid materials and an appropriate shielding gas, such as carbon dioxide, and being supplied under pressure, is forced into the body or tube 12, accumulates in chamber 38, and then passes downwardly through the channels 32 toward the tip 44 of the electrode. The flux thus coats a substantial portion of the electrode, but does not coat the protrusions 33, which are in sliding contact with tube 12. Thus, the electrical contact between the electrode and the tube is not interfered with by supplying the flux through channels 32.

The body or tube 12 carries, as by screw threading or the like, a nozzle 46 through which a restricted portion 48 of the body or tube 12 extends. Portion 48 of the body or tube 12 is formed with an annular recess 50 and a tapering end portion 52, the latter terminating as at 64 preferably closely adjacent the tip 44 of the electrode. This positions end 64 of tube 12 in a position to maintain the flux coating of the electrode down almost to the tip of the electrode, and thus literally holds the flux in contact with the electrode to within a short distance of the tip of the electrode.

Shielding gas, such as carbon dioxide, is preferably supplied from a suitable source under pressure to shield the arc 22. The gas is supplied to conduit 56, which may be secured to the nozzle in any appropriate manner and communicates through nozzle opening 58 with the space defined by recess 50 and the nozzle; this space forms a pooling chamber 60 for the shielding gas from which the gas passes towards the welding arc 22 through a plurality of spaced passages 62 defined by the configuration of the portion 48 of body or tube 12 and the nozzle 46, and then down around the arc 22 as indicated by the arrows of Figure 1, to shield same from harmful ambient air.

In some instances, it is desirable that ⅜₆ to ½ inch should separate the point (in the path traveled by the electrode) where welding current contact ends, and the electrode tip. To allow for this contingency, the portion 48 of body or tube 12 may be counterbored or enlarged slightly as indicated at 66. This retains the desired result of confining the coating of flux to the surface of the electrode within a short distance of the tip of the electrode.

Figures 3 through 9 illustrate modified form of the invention which produce channels similar to channels 32 of Figure 2. In the embodiment of Figure 3, the passageway 30a is square in cross-sectional configuration while the electrode is rounded or circular in cross-sectional configuration, thus providing channels 32a through which the fluid flux passes to the welding arc 22. The electrode 16a makes electrical contact with the modified contact tube 12a at the centers of the plane surfaces 70 that define the passageway 30a.

Figures 4 through 9 are suggestive of electrode cross-sectional configurations that may be employed in place of that shown in the embodiment of Figure 2 to provide fluid flux feed channels that are similar to channels 32 and 32a, while at the same time insuring electrical contact between the electrode and the contact tube 12. The electrodes 16b, 16c, 16d, 16e, and 16f provide protrusions 33b–33f, respectively, which define with tube 12 channels 32b–32f, respectively. Electrode 16g provides a single protrusion 33g in the form of the rounded outer surface of the electrode, which terminates in a groove 105 that forms with tube 12 a single channel 32g.

The type of arc that the flux is fed to is particularly important, and Figure 1a diagrammatically illustrates the type of arc contemplated by this invention. The arc 22 may be termed a jet type arc, as in accordance with our invention, the electrode metal is completely vaporized at the tip 44 of the electrode, and hence the metal is transferred through the arc as a vapor. Arc 22 actually is a high speed continuous stream of vaporized metal.

It is well known that, in the older forms of standard welding processes, the electrode metal is transferred through the arc in globule form and thus a continuous jet of metal is not provided. We contemplate that the welding current densities employed will be such that the heat of the arc will completely ionize any portion of the electrode which happens to detach itself from the electrode tip before the globule travels any appreciable distance beyond the tip of the electrode, so that the metal making up arc 22 will be entirely vaporized.

The relatively high welding current densities employed thus convert the electrode material from a solid into a vapor, and in so doing, the volume of metal is expanded many times its original solid state. It is this expansion which creates the jet action type arc shown in Figures 1 and 1a. The jet type action which develops at the tip of the electrode and which continues to exist all during the welding operation as the electrode is continuously fed to the arc, creates a vacuum or an evacuated area in the zone between dotted lines 80. The extent of evacuation within this zone is proportional to the velocity of the metal vapor that is in effect squirted from the tip of the electrode; the evacuated area is generally annular in configuration and as indicated in Figure 1a, it extends outwardly beyond the peripheral tip of the electrode. The dimension of this evacuated area laterally of the electrode may be termed its thicknesss, and this dimension is an important factor in the carrying out of our invention since it insures that all or substantially all of the fluid flux feeding out of the current contact tube 12 is sucked into the jet stream that forms welding arc 22. We have found that for a proper operation of the invention, the fluid flux coating about the electrode should be restricted to a thickness which insures that the fluid flux flow is within the outer boundary of the evacuated area.

More specifically, it may be assumed for the purposes of this disclosure that the irregular shaped electrodes shown in Figures 2 and 4 through 9 have a cross-sectional area that is equal to that of a round ⅟₁₆ inch diameter electrode. The material making up the electrodes is ordinarily deposited on the workpiece 28 with a minimum welding current of 350 amperes, through preferably the amperages employed are higher to provide correspondingly higher welding current densities (amperes per square inch of electrode cross-section). At these high welding current densities, the diameter of the metal vapor jet stream leaving the tip of the electrode is roughly the diameter of the electrode, namely, ⅟₁₆ inch. With the welding current density provided on a ⅟₁₆ inch electrode by 350 amperes, the dimension of the useful portion of the evacuated area existing about the periphery or rim of the electrode tip, that is, the distance X of Figure 1a, is approximately .050 inch; thus, the fluid flux coating passing along the surface of the electrode at its tip should be confined within a feed path that has its perimeter spaced from the maximum cross-sectional dimension of the electrode .050 inch on either side of the electrode. Thus, in the embodiment of Figure 1, the perimeter of the feed path at the tip of the electrode 16 would be spaced .050 inch from protrusions 33.

If a higher welding current density is employed, as for example, by employing an amperage of 450 amperes on the ⅟₁₆ inch electrode, then the force of the metal vapor jet forming the arc 22 is increased; this in turn increases the size of the evacuated area, which allows a slight increase in the thickness of the fluid flux coating employed. For example, the annular path through which the fluid flux coating is to pass may be increased by a thickness of .060 inch.

Also, by employing highly efficient ionizing materials, such as the aforementioned lithium-carbonate or titanium-dioxide, in the flux formula, the jet action normally produced by a given welding current density is increased to further increase the size of the evacuated area.

An important feature of the invention is that the restriction of the thickness of the fluid flux coating about the electrode does not restrict the ratio of flux volume with respect to the size of electrode employed. As the flux is fed to the arc in a fluid state, and is not attached or adhered to the electrode, the speed at which the flux is fed through the channels (for instance, channels 32) can be equal to the rate of electrode feed, or the speed can be greater or lesser as necessary to maintain the desired ratio of flux volume fed to the electrode size employed. Thus, this important ratio can be modified and controlled without varying or affecting the thickness of the fluid flux coating about the surface of the electrode employed.

However, in no case should the speed at which the fluid flux is fed to the evacuated area be greater than the rate at which the flux is drawn or sucked into the arc. If the speed of flux speed is too great, flux waste occurs and accurate control of the ratio of volume of flux feed to the volume of electrode material consumed is prevented; of course, this ratio must be controlled within accurate limits for best welding results.

It should be noted that within the torch 10 the flux coating thickness is well controlled in the illustrated embodiments as it is confined within the maximum dimension of the electrode employed, due to the fact that protrusions 33 are in sliding contact with the tube. This insures that the flux is kept within the above defined feed path; the enlargement 66 of tube 12 should not be greater than the estimated maximum dimension of the evacuated area at the electrode tip, since the flux will tend to coat even the protrusions 33 at this area of the torch, and it is desirable to maintain the outer perimeter of the flux coating at its above specified limit to a point closely adjacent the electrode tip. Where enlargement 66 is not employed, it is apparent that the flux is confined to a path that is well within the outer limit of the evacuated area.

A typical example of a procedure used with the apparatus illustrated in Figure 1 for carrying out my invention is as follows:

The volume by weight of the dry granular flux materials fed into the evacuated area amounts to about twenty percent of the electrode metal feed when the size of the electrode is comparable to 1/16 inch. With a welding current amperage of 450 amperes, the 1/16 inch electrode is converted into metal vapor and transferred through the arc at the rate of about twenty pounds per hour and thus, about four pounds of fluid flux per hour is fed into the evacuated area where it furnishes the necessary welding chemistry. The granular flux materials are fluidized by the addition of about two cubic feet of carbon-dioxide gas.

Of course, it is difficult to accurately locate the periphery of the evacuated area outlined by dotted lines 80 in Figure 1a. We have definitely established, however, that if a current density of not less than 75,000 amperes is used, a sufficient degree of exhaustion exists to carry out this invention if the fluid flux coating of the electrode at its tip is confined within a limiting perimeter that is spaced from the electrode tip not further than a dimension which is equivalent to ninety percent of the diameter of the electrode, if the electrode is circular, or which is equivalent to ninety percent of the diameter of the circle in which protrusions or corners similar to protrusions 33 and 33b–33g lie, if the electrode is irregular in cross section.

A further important feature of the invention is illustrated by the electrode shown in Figure 10. Regardless of how well balanced the formula of a welding flux may be for producing the highest possible degree of arc stability, there are instances where the pool 90 of molten metal erupts and sends small globules of the liquid flux material up out of the crater formed by the arc into space. Also, the jet force of the arc is such that not all of the ionized electric metal has time to combine with the liquid metal in the bottom of the crater, and hence a small portion of the ejected metal vapor and the ejected small globules tend to collect on the lower end of the current contact tube 12; eventually, this accumulation can plug the channels or openings from which the fluid flux is fed to the evacuated area.

To insure that this accumulation at the lower end of the tube or body 12 is prevented, the electrode is formed to constantly ream out the channels through which the fluid flux feeds, and in accordance with my invention, this is done by making the electrodes of the type shown in Figures 2 and 4 through 9 in the form of a spiral.

Electrode 100 of Figure 10 as illustrated initially has a cross-sectional configuration identical to that of Figure 2 and is spiraled first in one direction and then in the opposite direction as indicated in the figure.

This spiral twist is applied to the electrode during the conventional operation employed when the electrode is coiled onto customer weight reels. The spiral is twisted in one direction and then in the other direction, as by drawing the electrode wire through cams which rotate at 180° back and forth and in opposite directions as the wire electrode is drawn through them by the coiling machine. Preferably, the spirals are in opposite directions at a spacing of about 12 inches apart. Of course, other apparatus or devices may be employed to twist the electrode 100.

It will be appreciated that when electrode 100 is fed through welding torch 10, the corners 102 act as abrading edges on the surfaces of the tube 12 that they contact. Within the enlarged area 66 of tube 12 they tend to break the welding spatter away from the tube 12.

Alternately, the electrode can be twisted back and forth by an appropriate cam action device located at the intake end of the tube 12. As shown in Figure 1, the device might comprise a pair of rollers 150 rotatably mounted on worm wheel 152 which is oscillated by worm gear 154 actuated in any suitable manner, either by hand or automatically. Rollers 150 bear against the sides of electrode 16 and twist the electrode as wheel 152 is twisted. Electrode 16 passes through the center of wheel 152, and wheel 152 may be supported and insulated in any suitable manner.

Of course, all the forms of electrodes shown in Figures 2 and 4–9 may be arranged in a similar manner to provide this reaming action.

The irregular shaped electrodes shown in Figures 2 and 4 through 9 are very economical to manufacture as the different shapes are easily produced by drawing a round wire through a tungsten-carbide draw die, or by drawing a round wire through a cluster of forming rolls (commonly called a "turks-head"). Generally, a single passage through either of these forming operations is sufficient to form the desired shape.

In the electrodes shown in Figures 2–8 the welding flux passes over the outer surfaces of the electrode with the exception of those surfaces or edges that are in contact with contact tube or body 12. In these embodiments of the invention, the fluid flux is in contact with a great proportion of the outer surface of the electrode. As stated above, in the area of the fluid flux feed channels defined by counterbore or recess 66, the fluid flux tends to entirely cover the electrode.

In the embodiment of Figure 9, the fluid flux feed channel 105 is disposed substantially internally of the electrode, and thus the flux is fed directly into the arc 22. Electrodes of the type shown in Figure 9 are designed for use with lower welding current densities.

In the showing of the invention of Figure 1, only sufficient structure has been illustrated to adequately describe the invention. Of course, the torch 10 will include a handle and suitable insulating shields to protect the operator. While there is no tendency for the fluid flux to flow upwardly through the tube 12 because of the feeding of electrode downwardly through the passageway 30 of the tube, a form-fitting felt washer 110 may be applied in any suitable manner to the intake end of tube 12.

Referring now to the embodiment of Figure 11, reference numeral 120 indicates a welding torch contact tube through which electrode 16e is fed to the arc 122. Tube 120 includes tubular arm 124 on which is mounted a fiber handle 126 that carries the elements of switch 128. Leads 26 and 29 respectively connect arm 124 and the workpiece 28a to appropriate welding machine 24. Contacts 130 and 132 of switch 128 are connected to an appropriate electrical device for actuating machine 24.

Tube 120 is functionally the same as tube 12 of Figure 1 with regard to the electrical contact made by the electrode with the tube and the fluid flux coating that is applied to the electrode. As illustrated, recess 66 is omitted, however, though it may be provided where considered necessary. Recess 36a of the tube is interposed in passage 30a to receive the fluid flux 140 supplied through passageway 142 of arm 124 from an appropriate source, such as the apparatus disclosed in said Patent No. 2,549,033. When switch 128 is actuated, electrode 16e is supplied to tube 120 from reel 144 by rollers 18a (powered in any suitable manner). The fluid flux is supplied to recess 36a, and welding current is supplied to the electrode through arm 124 and tube 120, all in the same manner as described above.

The protrusions 33e of electrode 16e are in contact with tube 120 practically all the way down to the tip of the electrode, and the electrode is coated with fluid flux by recess 36 supplying same to passages 32e. The contact tube 120 thus confines and therefore governs the thickness of the flux coating, and passages 32e are preferably proportioned so that the outer perimeter of the flux coating is within the outer perimeter of the evacuated area at the tip of the electrode. It is contemplated that in the embodiment of Figure 11, the evacuated area would be formed and augmented as described above. This insures that all of the fluid flux coating is sucked into the arc and becomes a part of the arc chemistry as a whole.

The shielding gas 150 is not supplied from a separate source in this embodiment of the invention, but the arc is protected by the materials making up the fluid flux. This eliminates the need for a nozzle, such as nozzle 46 of Figure 1, and this is done as follows:

As in the case of formulas of flux adhered to the surfaces of conventional flux coated electrodes, in accordance with this invention also the fluxes actually employed may be either of two types, namely, carbohydrate, or lime type formulas. In the carbohydrate type cellulose materials such as digested wood flour, or, sugar-beet pulp may be used for producing the arc shielding gas. In the lime type formulas calcium carbonate is used for emitting a carbon-dioxide gas for shielding the arc. If sodium-silicate is used in combination with a pulp material as an agent for fluxing the base metal it should be used in the form of sodium-silicate glass so that pre-dehydration is not required. In the case of a lime type formula, a liquid form of sodium-silicate may be used providing the complete mixture is baked to carry out dehydrogenation and then pulverized before using. In regard to either type of formula, both may and should, contain deoxidizing agents, such as ferro-silicon, ferro-manganese, silicon-manganese or aluminum materials for removing dissolved oxygen in the fused base metal. To produce a slag shielding blanket 152 on weld bead 154, either type formula may contain an oxide, preferably titanium-dioxide. A form of lithium may also be used in either type formula to increase arc stability by increasing the ionization of the arc.

Suitable formulas and compositions are listed on pages 191 and 192 of Welding Metallurgy by O. H. Henry and G. E. Claussen (2d ed.), 1949, published by American Welding Society.

This embodiment of the invention involves several new concepts. One of these involves a new theory regarding the phenomena of how the arc is shielded with a gas emitted from materials contained in flux coatings. In regard to conventional flux-coated electrodes in which the flux is bonded to the electrode, the generally accepted theory has been that the gas emitted from the coating was quite substantially confined to the outer region of the car stream, thus acting as a carrier between the vaporized electrode metal and the adjacent harmful ambient air. However, in accordance with our invention, substantially all of the flux which includes the materials which produce the shielding gas are sucked into the arc and become quite thoroughly mixed with the other flux materials including the vaporized electrode metal, and furthermore, the vacuated area extends beyond the thickness of the fluid flux coating, and therefore, ambient air containing oxygen is also sucked into the arc where it also becomes quite thoroughly mixed with all the vaporized materials. This phenomenon requires a new theory of operation to explain why it is that this oxygen from ambient air does not oxidize the vaporized electrode metal or the liquid crater metal. Simply stated, our theory is that the arc at the tip of a consumable electrode is a neutralized flame, that is, a body of burning gases of neutralized nature mixed with vaporized electrode metal. The success of our invention in producing quality weld metal depends on the neutral state of the gas atmosphere through which the vaporized metal is squirted, meaning, the flame cannot be either oxidizing or carbonizing in nature. The method used for controlling this is as follows:

When an electrode of a given size is vaporized with a given current density and squirted through the arc, a jet force is produced which in turn produces a vacuum around the tip of the electrode. The extent of both the jet force and the vacuum are in direct proportion to the current density. If no shielding medium of any kind is used, ambient air containing oxygen is sucked into the arc through this vacuated area and the vaporized electrode metal and the molten crater metal becomes badly oxidized. An unshielded arc of this type is generally called an open type arc. If, however, a flux containing cellulose materials (which are combustible) is also fed into this vacuated area in an amount which is substantially no more and no less than that amount which will be totally combusted by the oxygen from the ambient air, then the transfer of vaporized electrode metal is made through a neutral atmosphere and all of the other materials contained in the formula of flux such as deoxidizers, alloying agents, slag formers, etc., also make their way through the arc unaffected. In accordance with our invention, this is done by properly proportioning the cellulose materials to the other constituents of the fluid flux, and providing a rate of fluid flux flow that will neutralize the arc.

The same result may be had with lime type formulae, though the phenomenon regarding an arc shielded with carbon-dioxide gas liberated from, for instance, calcium-carbonate contained in a coating of flux is somewhat different than the above because this gas is not of a combustible nature. With the use of this material for arc shielding purposes, it is important that the vacuated area be filled as full as possible with the fluid flux so that the smallest possible amount of air containing oxygen is sucked into the arc. With this invention this is a rather easily controlled adjustment because it is merely necessary to open the control which governs the volume of flux fed to the vacuated area to increase the rate of flow to the point where not quite all of the flux is sucked into the arc. It will be evident when this condition is reached because a very small amount of unfused particles of the flux will be present on the surface of the base metal being welded. As there are no combustible materials in the flux to consume the small amount of atmospheric oxygen sucked into the arc, another method must be used to prevent this oxygen from attacking the vaporized and liquid metal. Furthermore, when as much as 70 percent of the calcium carbonate is converted into carbon-dioxide gas as it comes in contact with the heat of the arc a large portion of the carbon-dioxide is further broken down into carbon-monoxide and free oxygen; therefore, this free oxygen must also be handled. For handling the oxygen from these two sources deoxidizers are used and are contained in the fluid flux provided for coating the electrode. As used in arc welding fluxes, a deoxidizer is any suitable material which has a greater affinity for oxygen than has iron; the materials most commonly used for deoxidizing purposes are ferro-manganese, ferro-silicon, silicon-manganese and aluminum type. In the arc these materials in a vapor state take up all oxygen which is present and in so doing are converted into oxides, and as oxides they transfer through the arc and float on the surface of the molten weld metal where they form into small isolated islands of slag on the finished weld bead.

The amount of deoxidizers in the fluid flux coatings sucked into the upper region of the arc must also be ample for removing the dissolved oxygen contained in the fused base metal; otherwise the weld metal will be porous. As well as calcium-carbonate for producing the arc shielding gas and deoxidizer for removing oxygen in the atmosphere of the arc and from the fused base metal, the fluid flux coating must also contain alloying agents if these are desired for increasing the physical values of the weld metal, and also ionizers for increasing the jet force of the arc and for increasing arc stability; also an oxide for producing a slag shielding blanket should be included if such a blanket is desired, as well as a form of sodium silicate for fluxing the base metal, that is, a refining agent, if desirable under the circumstances. Thus, in accordance with the embodiment of Figure 11, instead of shielding the welding arc with a neutral gas to protect it from the harmful ambient air, we neutralize the arc itself by employing materials in the fluid flux that chemically combine with the undesirable substances that are sucked into the arc. The neutralizing substances employed, and, as a matter of fact, the flux formulas employed may be any of the conventional flux formulas commonly employed in the past that will accomplish the objects of our invention.

While carbon dioxide has been described herein as an appropriate shielding and flux conveying gas, any type of gas commonly used for gas shielding purposes, such as helium or argon, may be employed in place of carbon dioxide.

It will be noted that in both the embodiments of Figures 1 and 11 the welding current is conducted through only a relatively short portion of the electrode (that is, that portion of the electrode extending from the contact tube to the arc). Since high current densities are employed, this insures that the electrode will not be harmfully resistance heated during operation of the apparatus.

The terms "irregular shape," or "irregularly shaped" as used in the appended claims with reference to the cross-sectional configuration of the electrode, means cross-sectional configurations of the types shown in Figures 2 and 4–9, as well as all others providing equivalent results. While the illustrated electrodes are disclosed as having a cross-sectional area equivalent to that of a round 1/16 inch electrode, other sizes can be used, as for instance, sizes having cross-sectional areas comparable to plain round electrodes of 1/32 to 1/8 inch in diameter.

The foregoing description and the drawings are given merely to explain and illustrate our invention and the manner in which it may be performed, and the invention is not to be limited thereto except in so far as the appended claims are so limited since those skilled in the art who have our disclosure before them will be able to make modifications and variations therein without departing from the scope of the invention.

We claim:

1. An arc welding method including the steps of establishing an electric welding arc between the end of a bare irregular shaped consumable electrode and a workpiece, feeding the electrode toward the workpiece to maintain the arc, charging the electrode with welding current as it is fed through a welding current contact tube which is the head portion of a welding torch, coating a substantial portion of the electrode surface with a fluid form of welding flux inside the welding current contact tube through which the electrode is also fed, and using sufficient welding current density to produce a jet type arc with sufficient force for producing an evacuated area around the tip of the electrode which is greater in cross-sectional area than the overall area of the fluid flux coated electrode, whereby substantially all of the fluid flux is sucked into said evacuated area.

2. A fluid flux consumable electrode electric arc welding apparatus comprising a torch including a welding current contact tube, a bare consumable electrode, said electrode extending through said contact tube to the arc and proportioned for electrical contact therewith, means for providing a relatively high rate of transfer of the electrode material from the tip of the electrode to the arc whereby an evacuated area is created at the tip of the electrode which is greater than the cross-sectional area of the electrode, said electrode and said tube being formed to define at least one channel extending longitudinally of said electrode and along its bare surface, said channel having an outer perimeter which is within the outer perimeter of said evacuated area laterally of said electrode, a source of fluid flux under pressure and in communication with said channel, said tube terminating closely adjacent the tip of the electrode, and means for feeding the electrode through said tube to maintain the arc, whereby said contact tube confines the outer perimeter of the fluid flux flow to the arc within the outer perimeter of said evacuated area laterally of said electrode.

3. Fluid flux consumable electrode arc welding apparatus comprising, a consumable electrode, a torch including a body formed with a passageway through which said electrode passes to the arc, means for feeding said electrode to said passageway, said electrode and said passageway being formed to define conduit means extending longitudinally of said electrode, a source of fluid flux under pressure and in communication with said conduit means, with the downstream end of said conduit means being disposed closely adjacent the tip of the electrode, and means for providing a relatively high rate of transfer of the electrode material from the tip of the electrode to the arc, whereby an evacuated area is created at the tip of the electrode which is greater than the cross-sectional area of the electrode, said conduit means extending laterally of said electrode no further than said evacuated area does, whereby said electrode is coated with a fluid flux flow within said torch, and said fluid flux flow is conveyed directly to said evacuated area whereupon the fluid flux is drawn directly into the arc.

4. A welding torch for fluid flux consumable electrode arc welding apparatus comprising a body formed with a passageway through which the electrode passes to the arc, a nozzle carried by the body and overlying the downstream end of the passageway, said nozzle being formed with an opening through which the electrode passes, said electrode and said passageway being formed to define conduit means extending longitudinally thereof, a source of fluid flux under pressure, conduit means extending between said source of fluid flux and the first mentioned conduit means, and means for providing a relatively high rate of transfer of the electrode material from the tip of the electrode to the welding arc, whereby an evacuated area at the tip of the electrode is created which is greater than the cross-sectional area of the electrode, said fluid flux passing through the second mentioned conduit means into said first mentioned conduit means and thence into said evacuated area during operation of the apparatus.

5. A welding torch for fluid flux consumable electrode electric arc welding apparatus comprising a body formed with a passageway through which the electrode passes to the arc, a nozzle carried by the body and overlying the downstream end of the passageway, said nozzle being formed with an opening through which the electrode passes, said electrode and said passageway being formed to define conduit means extending longitudinally thereof, a source of fluid flux under pressure, conduit means extending between said source of fluid flux and the first mentioned conduit means, said passageway including a pooling chamber that surrounds said electrode, and the first and second mentioned conduit means being in communication with said pooling chamber, and means for providing a relatively high rate of transfer of the electrode material from the tip of the electrode to the welding arc whereby an evacuated area at the tip of the electrode is created which is greater than the cross-sectional area of the electrode, said first mentioned conduit means providing a fluid flux coating along the electrode which corresponds in maximum thickness to the difference between the evacuated area at the tip of the electrode and the cross-sectional area of the electrode, said fluid flux passing through the second mentioned conduit means into said pooling chamber and thence into said first mentioned conduit means through which it passes along the surface of the electrode into the evacuated area during operation of the apparatus.

6. The welding torch set forth in claim 5 wherein said passageway of said body is circular in cross-sectional configuration and wherein said electrode is formed to provide said first mentioned conduit means.

7. The welding torch set forth in claim 5 wherein said electrode is circular in cross-sectional configuration and wherein said passageway of said body is formed to provide said first mentioned conduit means.

8. The welding torch set forth in claim 5 wherein said body overlies said electrode to a point closely adjacent the tip of said electrode, whereby said maximum thickness of said fluid flux coating is maintained adjacent the tip of the electrode.

9. The welding torch set forth in claim 8 wherein the downstream end of said passageway of said body is recessed laterally of said electrode to space said body from the electrode tip.

10. In fluid flux consumable electrode welding apparatus including a contact tube and a consumable electrode passing through the tube to the welding arc with the electrode being in electrical contact with the tube, the improvement wherein said tube and said electrode are formed to define at least one channel for fluid flux that extends longitudinally of the electrode, and including means for supplying fluid flux to said channel under pressure, whereby the fluid flux is fed to the arc as a coating for at least a portion of the electrode, said fluid flux containing means for chemically neutralizing the arc.

11. In fluid flux welding apparatus including a torch having a welding current contact tube through which a consumable type electrode is fed to the welding arc, the improved method of welding wherein a supply of fluid flux is directed about the tip of the electrode during operation of the apparatus to be sucked into the arc by the vacuum produced by the arc, and wherein the fluid flux is applied to the surface of the electrode inside the welding current contact tube as and where the electrode becomes charged with welding current.

12. The improved method set forth in claim 11 wherein channels are formed between the electrode and the bore of the current contact tube, which provides for the feeding of fluid flux between the contact tube and the electrode, without interfering with making efficient welding current contact to the electrode.

References Cited in the file of this patent

UNITED STATES PATENTS

| 2,025,206 | Holslag | Dec. 24, 1935 |
| 2,210,786 | Wasmund | Aug. 6, 1940 |
| 2,211,424 | Holslag | Aug. 11, 1940 |
| 2,504,868 | Muller et al. | Apr. 18, 1950 |

FOREIGN PATENTS

| 463,131 | Great Britain | June 19, 1935 |